(12) United States Patent
Seta et al.

(10) Patent No.: US 6,733,274 B2
(45) Date of Patent: May 11, 2004

(54) INJECTION MOULDING MACHINE AND MOULDING METHOD

(75) Inventors: Kunihito Seta, Nagaokakyo (JP); Takeshi Takeda, Nagaokakyo (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 58 days.

(21) Appl. No.: 10/112,724

(22) Filed: Apr. 2, 2002

(65) Prior Publication Data

US 2002/0140132 A1 Oct. 3, 2002

(30) Foreign Application Priority Data

Apr. 2, 2001 (JP) .......................... 2001-102754

(51) Int. Cl.[7] .............................................. B29C 45/66
(52) U.S. Cl. ..................... 425/589; 425/451.2; 425/590
(58) Field of Search ............................... 425/574, 575, 425/589, 590, 450.1, 451, 451.2

(56) References Cited

U.S. PATENT DOCUMENTS 5,888,560 A * 3/1999 Naderhirn ................... 425/589
6,488,884 B1 * 12/2002 Daubenbüchel et al. . 425/450.1

* cited by examiner

Primary Examiner—Tim Heitbrink
(74) Attorney, Agent, or Firm—Burns, Doane, Swecker & Mathis, L.L.P.

(57) ABSTRACT

A method of injection-moulding includes separating an injection nozzle from a mould during every moulding cycle. An apparatus for carrying out the method is also disclosed.

2 Claims, 5 Drawing Sheets

PRIOR ART

INJECTION MOULDING MACHINE AND MOULDING METHOD

BACKGROUND AND SUMMARY

The present invention relates to a method of injection-moulding in which an injection nozzle is separated from a mould every moulding-cycle, and to an injection moulding machine for carrying out the method.

Generally, the moulding cycle of an injection moulding machine comprises the processes of injection, holding pressure, cooling, weighing, and opening and closing the mould. These processes are repeatedly carried out in this order. When the moulding is carried out with an injection nozzle kept in contact with the mould, heat from the nozzle is transferred to the mould, prolonging the cooling time. That is, the time taken for the moulding cycle cannot be reduced. Thus, an injection moulding machine is known in which the nozzle is separated from the mould every moulding cycle, so that the transfer of heat between the nozzle and the mould is kept to a minimum.

FIG. 5 shows an example of a known injection moulding machine. The injection moulding machine comprises an injection unit 100 having an injection nozzle 101, a mould 102, and a mould opening-closing unit 103. Furthermore, the injection moulding machine is provided with a hydraulic cylinder 104 which causes the injection unit 100 to move towards or away from the mould 102 so that the nozzle 101 comes into contact with, or is separated from, the mould 102.

However, to operate the hydraulic cylinder 104, hydraulic pressures must be switched by valve-operation. Thus, the switch-over operation is slow. For this reason, the moulding cycle cannot be achieved. Moreover, the hydraulic cylinder 104 needs to be operated synchronously with the opening and closing of the moulds. It is necessary to control the injection moulding machine 104 accurately at high speed. It is problematic that the mechanism for controlling the machine becomes complicated.

In the injection moulding machine of the related art, the mould opening-closing unit 103, which is a mechanism for opening and closing the moulds, and the hydraulic cylinder 104, which is a nozzle-touch mechanism, are driven independently of each other. Thus, the hydraulic cylinder 104 is caused to operate following opening and closing of the moulds at high speed with much difficulty. Therefore, problems are caused in that heat from the nozzle tip is readily transferred; defects in fluidity of resin such as so-called cold slag are easily caused, and the qualities of the moulded product become unstable.

The invention aims to address the above mentioned problems.

According to the invention there is provided a method of injection-moulding, comprising the steps of: operating a first mould (31) to move in a mould clamping direction and come into contact with a second mould (30); further operating the first mould (31) to move in the mould clamping direction while the first mould (31) is in contact with the second mould (30) and bring the second mould (30) into contact with an injection nozzle (11); operating the first mould (31) to move in the mould clamping direction integrally with the second mould (30) and the injection nozzle (11) until the second mould (30) reaches a retention position, while the second mould (30) is in contact with the injection nozzle (11); injecting a plasticated resin into the first and second moulds (31, 30) through the injection nozzle (11), while the second mould (30) is maintained at the retention position; operating the first mould (31) to move in a mould-opening direction after the injection to separate the second mould (30) from the injection nozzle (11); and further operating the first mould (31) to move in the mould-opening direction to separate the first mould (31) from the second mould (30).

The invention also provides an injection moulding machine comprising: a mould unit (B) and an injection unit (A) having an injection nozzle for injecting a plasticated resin into the mould unit (B) through the injection nozzle (11), the mould unit (B) comprising a mould opening-closing means, a first mould (31) drivable for opening or closing by the mould opening-closing means, a second mould (30) operable together with the first mould to define a cavity therebetween and to be brought into contact with the injection nozzle (11), a first guide means (39) for guiding the second mould (30) so that the second mould (30) can be moved in the mould opening-closing direction, a stroke-regulating means (40) for regulating the length of stroke in the mould opening-closing direction of the second mould (30), and a first energizing means (41) for energizing the second mould (30) in the direction of the first mould (31), and the injection unit (A) comprising a second guide means for guiding the injection nozzle so that the injection nozzle (11) can be moved in the mould opening-closing direction, a stopper means for defining a limit position of movement of the injection nozzle (11) in the direction of the second mould (30) and a second energizing means (9) for energizing the injection nozzle (11) in the direction of the second mould (30), wherein the length of stroke S1 of the second mould (30) caused by the stroke regulating means (40) is set to be equal to or larger than the gap S2 between the second mould (30) and the injection nozzle (11) defined when the moulds are open.

The objects of the present invention have the advantage that the injection-moulding nozzle can be separated from a mould every moulding cycle by means of a simple mechanism and can correspond to opening and closing the mould at high speed.

In an first aspect of the invention, the first mould, when moved in the mould clamping direction, comes into contact with the second mould, and then the first and second moulds are moved together in the direction of the injection nozzle. The first mould is further moved in the mould clamping direction, so that the second mould comes into contact with the injection nozzle. In this state, the first mould is moved until the second mould reaches the retention position. Therefore, clamping of the first and second moulds and moreover, contact of the second mould with the injection nozzle can be securely achieved. In this state, a plasticated resin is injected into the first and second moulds through the injection nozzle.

Thereafter, when the first mould is moved in the mould-opening direction, the first and second moulds and the injection nozzle integrally move away. Then, the injection nozzle stops, and is separated from the second mould. The first mould is further moved in the mould-opening direction. The second mould then stops. The first and second moulds are then opened, and the moulded product therebetween is removed.

In the first aspect of the invention described, the stroke length S1 of the second mould is set to be larger than the gap S2 between the second mould and the injection nozzle. Therefore, the clamping and opening of the first and second moulds and also the contact and separation of the injection nozzle from the second mould can be carried out only by moving the first mould in the mould-clamping direction and in the mould-opening direction. Thus, the injection nozzle can be securely separated from the mould every shot, following the clamping and opening of the moulds. Accordingly, thermal conduction from the injection nozzle to the mould can be suppressed, and the cooling time for the moulds can be reduced. As a result, the time required for each moulding cycle can be reduced. Moreover, the tip of the nozzle and its vicinity can be maintained at high temperature, since the time when the tip of the injection nozzle is in contact with the mould can be reduced.

Moreover, according to the present invention, the second mould, while it is in contact with the injection nozzle, is further moved by a predetermined length in the mould-clamping direction. Therefore, the second mould can be securely brought into contact with the injection nozzle, and leakage of a plasticated resin can be prevented, even if thermal expansion and dimensional errors occur.

In a second aspect of the invention, the method of injection-moulding of the first aspect of the present invention can be applied by using a simple mechanism. In addition to the mould opening and closing means, the machine comprises the first and second moulds, the first guiding means for guiding the second mould so that the second mould can be moved in the mould opening and closing direction, the stroke-regulating means for regulating the length of stroke in the mould opening-closing direction of the second mould, and the first energizing means for energizing the second mould in the direction of the first mould, the second guiding means for guiding the injection nozzle in such a manner that the injection nozzle can be moved in the mould opening-closing direction, the stopper means for defining a limit position of the injection nozzle at which the movement of the injection nozzle in the direction of the second mould is limited, and the second energizing means for energizing the injection nozzle in the direction of the second mould. The stroke length S1 of the second mould caused by the stroke regulating means is set to be equal to or larger than the gap S2 between the second mould and the injection nozzle defined when the moulds are in the open state. Thus, for the purpose of moving the injection unit, no special operational mechanism is required. The injection nozzle can be securely separated from the mould, even if the moulds are opened and closed at high speed.

Spring, a hydraulic cylinder, a motor, and other possibilities may be used as the first and second energizing means. Where springs are used, the mechanism for opening and closing the moulds is the sole power source required for the springs. Thus, an injection moulding machine can be provided which is small in size and inexpensive.

BRIEF DESCRIPTION OF THE DRAWINGS

An embodiment of the invention will now be described, by way of example, and with reference to the accompanying drawings in which.

DETAILED DESCRIPTION

Figure 1:
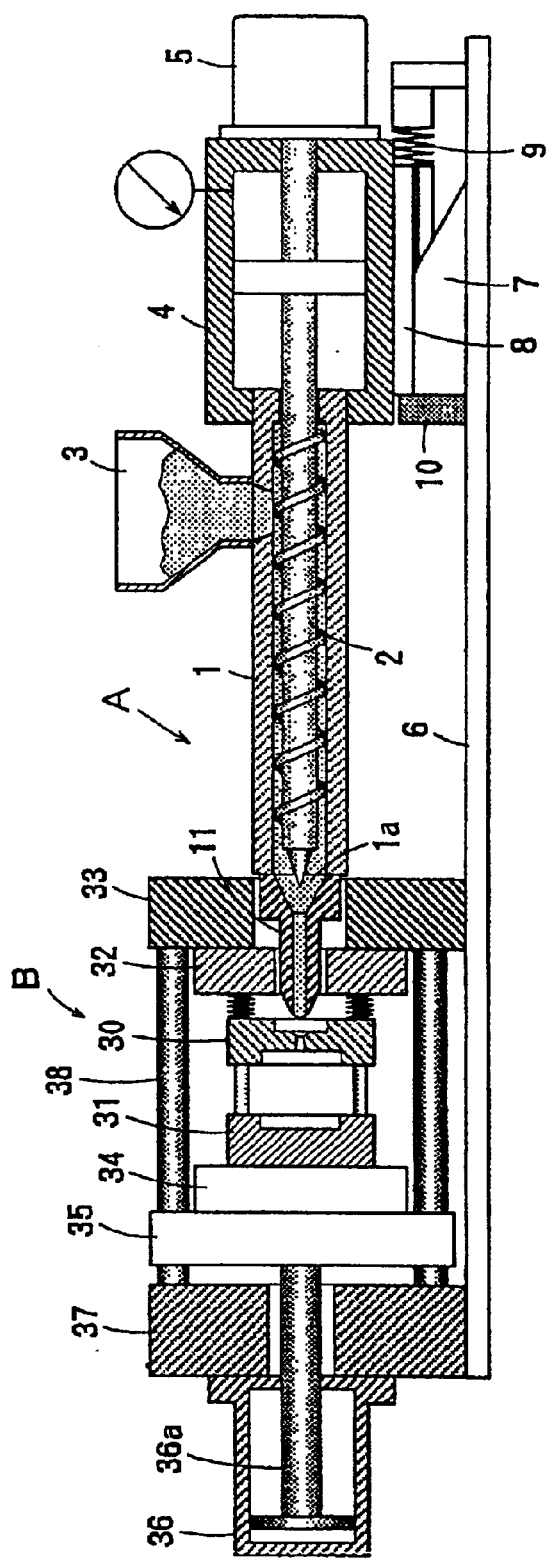
FIG. 1 is a cross-sectional view of the whole of an injection moulding machine embodying the present invention.

FIGS. 1 to FIG. 4D show an example of an injection moulding machine embodying the present invention.

This machine is a typical in line-screw moulding machine, and comprises a plastication and injection unit A for plasticating and then injecting a resin, and a mould unit B for cooling the injected resin.

A cylinder 1 constituting the plastication and injection unit A is heated to a predetermined resin-melting temperature by means of a heater (not shown). A screw 2 is disposed rotatably and movably in the axial direction inside of the cylinder 1, and functions to plasticate a resin supplied from a hopper 3 and feed the resin forwards. In the rear of the cylinder 1 are provided a direct-acting actuator 4 for moving the screw 2 in the forwards-backward direction and a rotation actuator 5 for rotating the screw 2. When the plasticated resin is stored in a chamber (reservoir) 1a, the screw 2 is moved backward by means of the direct-acting actuator 4, corresponding to the stored amount of the resin. During injection, the screw 2 is moved forward by means of the direct-acting actuator 4, so that the resin in the reservoir 1a is injected through an injection nozzle 11 which will be described later. A slider 8 is provided between the cylinder 1 and a slider-supporting plate 7 disposed on a base 6. The cylinder 1 is guided so that it can move in the forward-backward direction integrally with the actuator 4 and the rotation actuator 5. Moreover, a second energizing means, in this case a spring 9, for energizing the cylinder 1 in the forward direction is disposed between the cylinder 1 and the base 6. The slider 8 butts against a stopping means, here a stopper, 10 disposed on the base 6. That is, the front limit position at which the forward movement of the slider 8 is limited is provided. The injection nozzle 11 is fixed onto the tip of the cylinder 1. A shut-off mechanism (not shown) is provided for the injection nozzle 11, if necessary.

A mould unit B is arranged in front of the injection nozzle 11. The mould unit B contains a fixed mould 30 and a movable mould 31, which define a cavity between them. The fixed mould 30 is supported onto a base plate 32, which is fixed to a clamping plate 33. The clamping plate 33 is fixed to the base 6. The injection nozzle 11 passes through the clamping plate 33 and the base plate 32, and can come into contact with or be separated from the fixed mould 30. A clamping plate 35 is fixed to the back surface of the movable mould 31 through a base plate 34. An operating rod 36a of an actuator 36 for clamping the moulds is connected to the clamping plate 35. A clamping plate 37 for the mould-clamping actuator 36 is also fixed to the base 6. Plural guide shafts 38 are provided which extend between the clamping plate 37 and the clamping plate 33 for the fixed mould 30. The clamping plate 35 for the movable mould 31 is slidably guided by the guide shafts 38. Therefore, by driving the mould-clamping actuator 36, the movable mould 31 can be operated to move in the opening-closing direction with respect to the fixed mould 30. In this embodiment, a cylinder is employed, as the mould-clamping actuator 36, for example. Any drive mechanism and any system for the actuator may be employed, provided that a desired mould-clamping force can be obtained.

Figure 2:
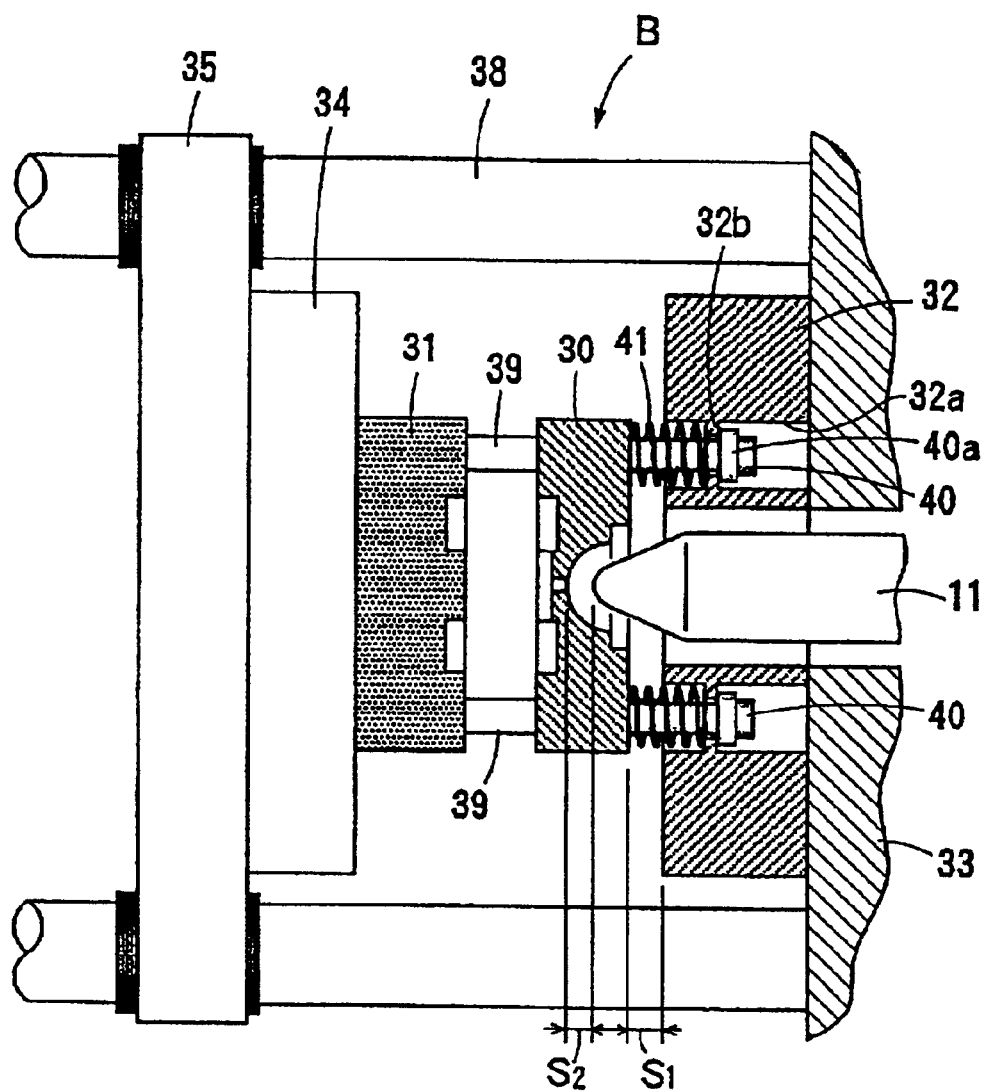
FIG. 2 is an enlarged view of the essential part of the injection moulding machine of FIG. 1.
Figure 3:
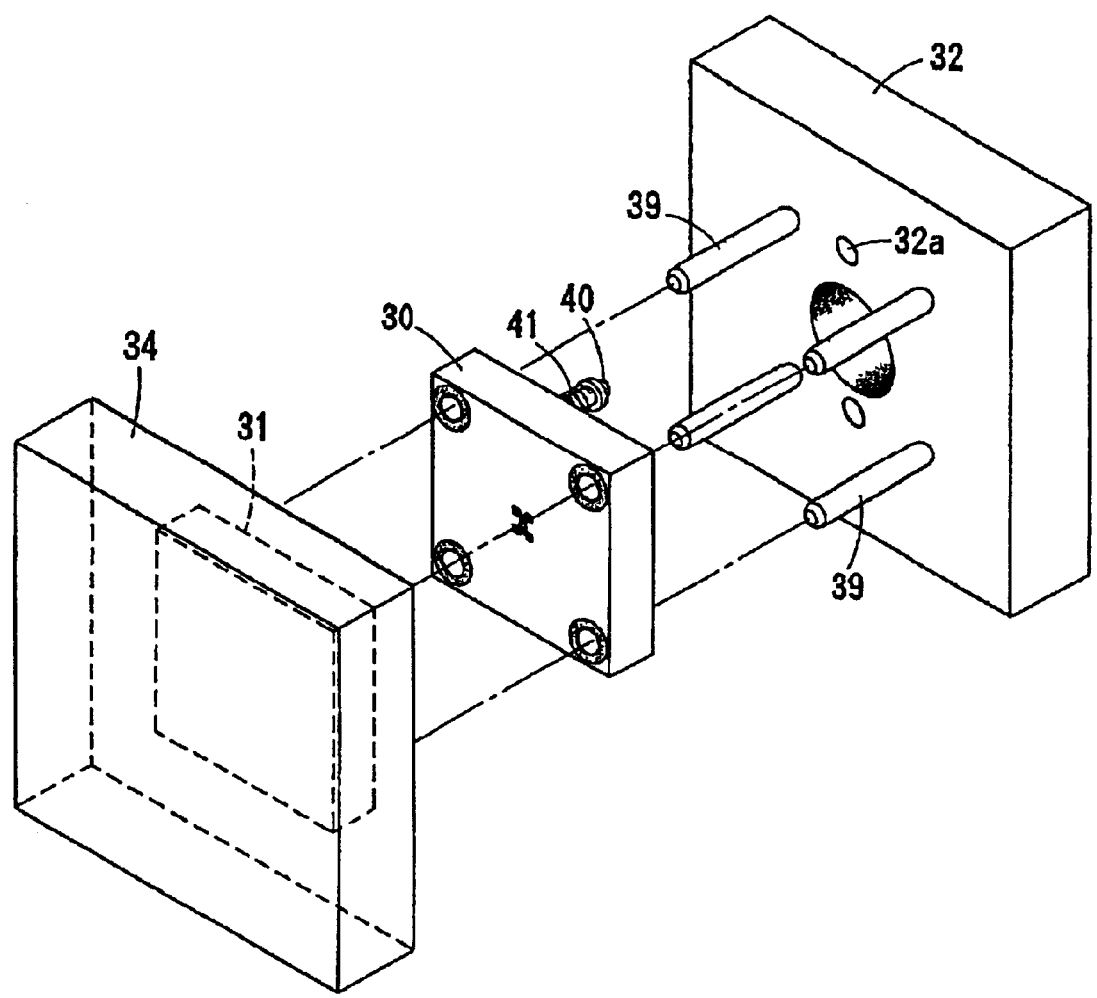
FIG. 3 is an exploded perspective view of a mould unit.
Figure 4:
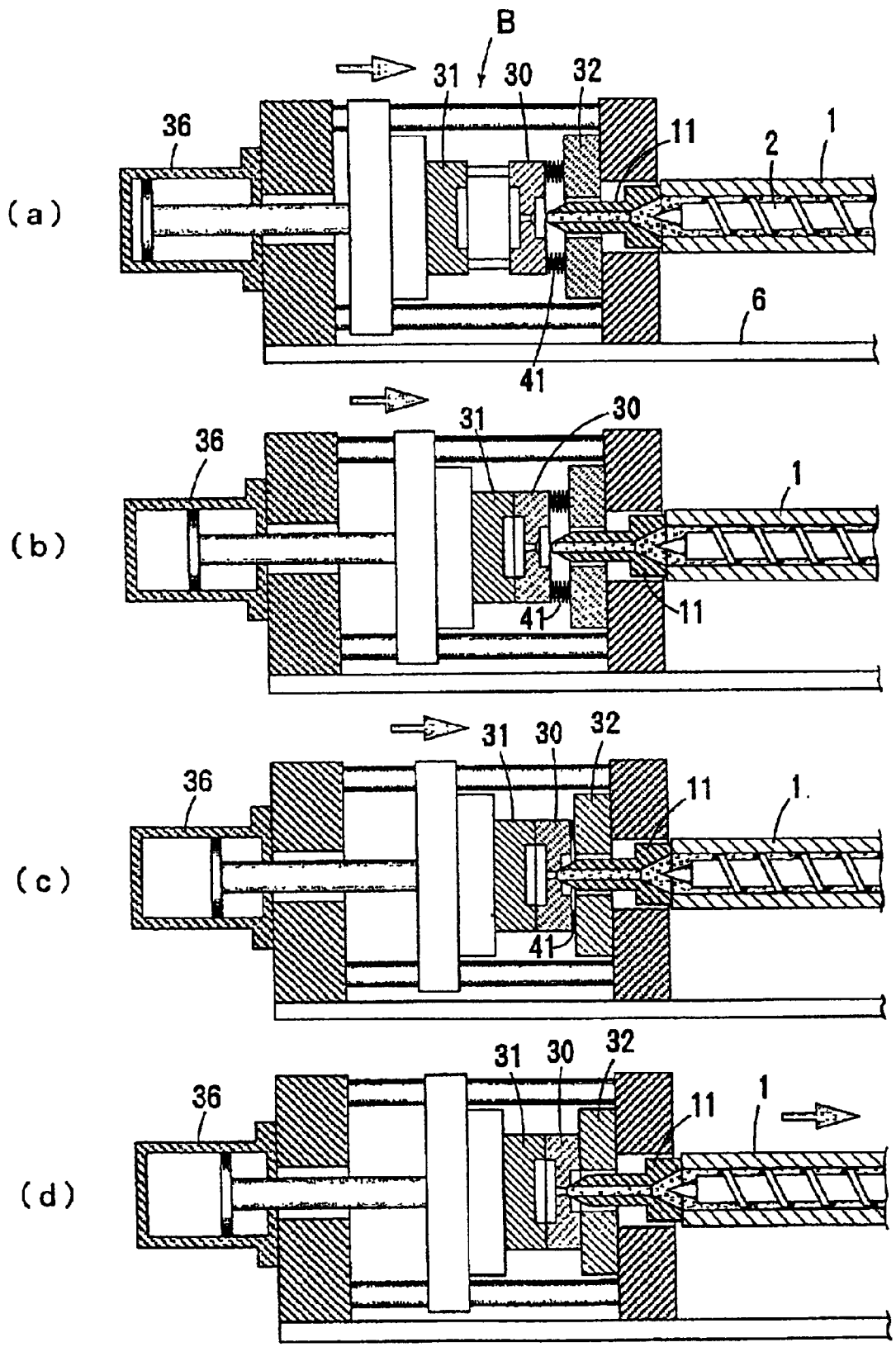
FIGS. 4A to 4D are illustrations of the operation of the mould unit.
Figure 5:
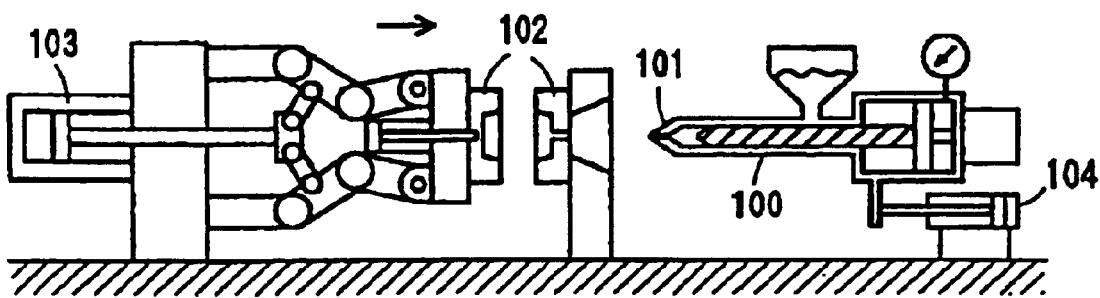
FIG. 5, referred to above, is an illustration of the structure of an example of a related art injection moulding machine.

As shown in FIGS. 2 and 3, plural (in this case, four) guide pins 39 are fixed to the fixed base plate 32. These guide pins embody a first guiding means. These guide pins 39 pass through the fixed mould 30 and are inserted into the movable mould 31. Thereby, the fixed mould 30 can be moved only in the mould opening-closing direction through the guide pins 39. Moreover, the fixed and movable moulds 30 and 31 can be positioned relatively to each other by the guide pins 39.

Two stripper bolts acting as a stroke-regulating means 40 are fixed to the back surface of the fixed mould 30. A flange 40a formed at the tip of each stripper bolt 40 is inserted into a hole 32a formed in the fixed plate 32, and is prevented from being released in the forward direction by means of an inner flange 32b formed on the inner wall of the hole 32a. The stripper bolts 40 regulate the stroke length S1 of the fixed mould 30 in the forward-backward direction. The stroke length S1 is set to be larger than the gap S2 between the fixed mould 30 and the injection nozzle 11. A spring embodying a first energizing means 41 is inserted onto each stripper bolt 40, and is disposed between the inner flange 32b and the back surface of the fixed mould 30, whereby the fixed mould 30 is ordinarily energized in the forward direction (in the direction of the movable mould).

Hereinafter, the operation of the mould unit B will be described with reference to FIGS. 4A to 4D.

FIG. 4A shows the moulds in the open state. The movable mould 31 is separated from the fixed mould 30. The fixed mould 30 is separated from the base plate 32. Moreover, the tip of the injection nozzle 11 is separated from the fixed mould 30. In this case, the gap S1 between the fixed mould 30 and the base plate 32 is larger than the gap S2 between the fixed mould 30 and the injection nozzle 11 (see FIG. 2). FIG. 4B shows the movable mould 31 moved in the mould-closing direction by the mould-clamping actuator 36 and in contact with the fixed mould 30. At this time, the fixed mould 30 is pushed in the forward direction by the spring 41, and the injection nozzle 11 and the fixed mould 30 have not brought into contact with each other yet.

FIG. 4C shows the movable mould 31 further moved in the mould-closing direction, so that the injection nozzle 11 and the fixed mould 30 are brought into contact with each other. In this state, the fixed mould 30 has not been brought into contact with the fixed base plate 32 yet. The movable mould 31 is still further moved in the mould-closing direction, so that the movable mould 31, the fixed mould 30, and the injection nozzle 11 are integrally moved in the backward direction. The injection nozzle 11 is integrally fixed to the cylinder 1, and the cylinder 1 is guided movably in the forward and backward direction by means of the slider 8. Therefore, the injection nozzle 11 is moved backward while it compresses the spring 9.

FIG. 4D shows the movable mould 31 moved still further in the mould-closing direction, so that the fixed mould 30 is pressed against the fixed base plate 32. In this state, the movable mould 31 and the fixed mould 30 are securely clamped to each other, and moreover, the injection nozzle 11 contacts the fixed mould 30 under pressure. In this state, the direct-acting actuator 4 moves the screw 2 forward, and the plasticated resin is injected through the injection nozzle 11 into the moulds 30 and 31.

In the processes illustrated in FIGS. 4C and 4D, the fixed mould 30 pushes the injection nozzle 11 in the backward direction by the stroke S3 (=S1−S2). Therefore, the fixed mould 30 and the injection nozzle 11 can be securely brought into with each other, even if the relative positions of the injection nozzle 11 and the fixed mould 30 are dispersed, which may be caused by thermal expansion of them and dispersion of their sizes.

After the injection and moulding, the movable mould 31 is moved in the mould-opening direction. That is, the mould is opened in the order of the process of FIG. 4D to that of FIG. 4A. In this case, the injection nozzle 11 is separated from the fixed mould 30 before the movable mould 31 and the fixed mould 30 start to be opened. Thus, the time when the injection nozzle 11 is in contact with the fixed mould 30 is short. Accordingly, thermal conduction from the injection nozzle 11 to the mould 30 can be inhibited, and the cooling time for the moulds can be reduced.

Moreover, even if the movable mould 31 is opened or closed at high speed, the injection nozzle 11 can be securely separated from the fixed mould 30 every shot, following the opening or closing of the mould 31.

Needless to say, the present invention is restricted to an in-line screw moulding machine as described in the embodiment. The principles of the present invention apply to a variety of publicly-known injection moulding machines. Moreover, the mould opening-closing direction and the movement direction of the injection nozzle do not need to be horizontal. The directions may be at an angle, for example vertical.

In the embodiment described above, the injection nozzle 11 is integrated with the injection unit A (cylinder 1), and the whole of the injection unit A is operated in opposition to the mould unit B. The following alternative structure may be provided: the injection unit A is fixed in a predetermined position, the injection nozzle is provided so as to be movable in the forward-backward direction with respect to the injection unit A, and after the second mould is brought into contact with the injection nozzle, the injection nozzle, not together with the cylinder, can be moved backward. In this case, a sealing mechanism is required between the injection nozzle and the injection unit. Accordingly, the structure of the injection nozzle integrated with the injection cylinder described in the preferred embodiment is much simpler.

As seen in the above description, according to the method of injection-moulding embodying the present invention, not only clamping and opening of the first and second moulds but also contact and separation of the injection nozzle from the second mould can be performed only by operating the first mould to move in the mould-clamping direction and in the mould-opening direction. That is, the injection nozzle can be securely separated from the mould every shot, following the opening and closing of the moulds. Accordingly, thermal conduction from the injection nozzle to the mould can be suppressed, and the cooling time for the moulds can be reduced. That is, the time taken for the moulding cycle can be reduced.

Moreover, the tip of the nozzle and immediately adjacent areas can be maintained at high temperature, since the time when the tip of the injection nozzle is in contact with the mould can be shortened. Therefore, formation of so-called cold slag, which is one of the defects in fluidity of the resin, can be prevented. The qualities of the moulded product become stable.

Moreover, since the second mould, while it is in contact with the injection nozzle, is further moved in the mould-clamping direction by a predetermined length, the second mould can be securely brought into contact with the injection nozzle, and leakage of a plasticated resin can be prevented, even if thermal expansion and dimensional errors occur.

In accordance with an embodiment of second aspect of the present invention, the method of injection-moulding can be carried out by a simple mechanism. The size of the injection moulding machine is not increased. The injection nozzle can be securely separated from the mould every shot, even if the moulds are opened and closed at high speed.

What is claimed is:

1. An injection moulding machine comprising:
   a mould unit and an injection unit having an injection nozzle for injecting a plasticated resin into the mould unit through the injection nozzle, the mould unit comprising a mould opening-closing means, a first mould drivable for opening or closing by the mould opening-closing means, a second mould operable together with the first mould to define a cavity therebetween and to be brought into contact with the injection nozzle, a first guide means for guiding the second mould so that the second mould can be moved in the mould opening-closing direction, a stroke-regulating means for regulating the length of stroke in the mould opening-closing direction of the second mould, and a first energizing means for energizing the second mould in the direction of the first mould, and the injection unit comprising a second guide means for guiding the injection nozzle so that the injection nozzle can be moved in the mould opening-closing direction, a stopper means for defining a limit position of movement of the injection nozzle in the direction of the second mould and a second energizing means for energizing the injection nozzle in the direction of the second mould, wherein the length of a stroke S1 of the second mould caused by the stroke regulating means is set to be equal to or larger than a gap S2 between the second mould and the injection nozzle defined when the moulds are open.

2. An injection moulding machine according to claim 1, wherein both of the first and second energizing means are springs.

* * * * *